(12) United States Patent
Elliott

(10) Patent No.: US 10,119,633 B2
(45) Date of Patent: Nov. 6, 2018

(54) PRECAST SEGMENTED ANNULAR STRUCTURE WITH STRUCTURAL JOINT

(71) Applicant: JENSEN ENTERPRISES, INC., Sparks, NV (US)

(72) Inventor: Thomas Elliott, Reno, NV (US)

(73) Assignee: Jensen Enterprises, Inc., Sparks, NV (US)

( * ) Notice: Subject to any disclaimer, the term of this patent is extended or adjusted under 35 U.S.C. 154(b) by 0 days.

(21) Appl. No.: 15/466,017

(22) Filed: Mar. 22, 2017

(65) Prior Publication Data

US 2017/0276266 A1 Sep. 28, 2017

Related U.S. Application Data

(60) Provisional application No. 62/314,003, filed on Mar. 28, 2016.

(51) Int. Cl.
*F16L 9/22* (2006.01)
*E03F 5/02* (2006.01)
(Continued)

(52) U.S. Cl.
CPC .......................... *F16L 9/22* (2013.01); *E03F 5/02* (2013.01); *F16B 7/20* (2013.01); *F16L 9/085* (2013.01)

(58) Field of Classification Search
CPC ............ B65D 7/045; B65D 7/04; B65D 7/02; B65D 7/12; B65D 88/76; B65D 88/526; B65D 88/52; B65D 90/08; B65D 90/02; B65D 90/023; B65D 90/024; B65D 90/105; B65D 15/24; B65D 15/08; B21D 39/00; F16L 9/22; F16L 9/085; F16L 9/08; F16B 7/20; F16B 7/00; E03F 5/02

USPC .... 220/690, 682, 685, 683, 691, 677, 567.1, 220/566, 565, 610, 615, 4.09, 4.08, 4.07, 220/4.06, 4.04, 4.16, 4.12, 4.17, 692; 29/897.31

See application file for complete search history.

(56) References Cited

U.S. PATENT DOCUMENTS

| 880,597 A | 3/1908 | Syze |
| 1,489,274 A * | 4/1924 | Petty ..................... B65D 88/06 220/4.16 |

(Continued)

FOREIGN PATENT DOCUMENTS

| CN | 203296069 U | 11/2013 |
| CN | 204238248 U | 4/2015 |
| CN | 105019476 A | 11/2015 |

*Primary Examiner* — Robert J Hicks
(74) *Attorney, Agent, or Firm* — Knobbe Martens Olson & Bear LLP

(57) ABSTRACT

A segment for an annular structure includes an arcuate body extending between a first end and a second end. The segment includes a first plurality of interlocking portions extending from the first end and a second plurality of interlocking portions extending from the second end. Each interlocking portion includes a first leg and a second leg partially embedded in the arcuate body and a connecting portion connecting the first leg and the second leg, the connecting portion external to the arcuate body. The segment also includes a flange proximal to the first end and the second end of the arcuate body. Each flange includes a first spacing portion that extends radially outward from the outside surface and a second extending portion that extends distally from the main body portion.

20 Claims, 8 Drawing Sheets

(51) Int. Cl.
*F16L 9/08* (2006.01)
*F16B 7/20* (2006.01)

(56) References Cited

U.S. PATENT DOCUMENTS

| | | | |
|---|---|---|---|
| 1,565,681 A | | 12/1925 | Sonderby |
| 2,091,140 A | * | 8/1937 | Davis ................ E04C 2/043 |
| | | | 220/682 |
| 2,787,397 A | * | 4/1957 | Radford ............. B65D 11/02 |
| | | | 215/382 |
| 3,588,027 A | * | 6/1971 | Bowden ............ E04G 13/021 |
| | | | 220/4.28 |
| 3,980,311 A | | 9/1976 | Ditcher |
| 4,121,390 A | | 10/1978 | Hall et al. |
| 4,984,562 A | | 1/1991 | Pedersen et al. |
| 7,955,026 B2 | | 6/2011 | Kamiyama et al. |
| 8,245,452 B2 | | 8/2012 | Koteskey |
| 8,333,291 B2 | * | 12/2012 | Rosendahl ......... H02G 3/0493 |
| | | | 220/4.02 |
| 2014/0137508 A1 | | 5/2014 | Bussio |

\* cited by examiner

PRECAST SEGMENTED ANNULAR STRUCTURE WITH STRUCTURAL JOINT

INCORPORATION BY REFERENCE TO PRIORITY APPLICATIONS

This application claims the benefit of priority under 35 U.S.C. § 119(e) of U.S. Provisional Application 62/314,003, filed Mar. 28, 2016, which is incorporated by reference herein in its entirety. Any and all applications for which a foreign or domestic priority claim is identified in the Application Data Sheet as filed with the present application are hereby incorporated by reference under 37 CFR 1.57.

BACKGROUND

Field

This disclosure relates to in-ground and above-ground annular structures, and, in particular, to annular structures assembled from one or more precast segments.

Description

Annular structures, such as cylindrical structures, are common in a variety of in-ground (for example, buried) and above-ground applications requiring a variety of diameters and heights. In smaller or less deeply buried applications, rectangular structures can serve. However, in larger and/or more deeply buried applications, annular or cylindrical structures can be structurally and economically beneficial.

SUMMARY

The embodiments disclosed herein each have several aspects no single one of which is solely responsible for the disclosure's desirable attributes. Without limiting the scope of this disclosure, its more prominent features will now be briefly discussed. After considering this discussion, and particularly after reading the section entitled "Detailed Description," one will understand how the features of the embodiments described herein provide advantages over existing systems, devices, and methods for sorting items.

In a first aspect, a segment for an annular structure, such as a cylindrical structure, is disclosed. The segment includes an arcuate body extending between a first end and a second end, the arcuate body having an inside surface and an outside surface. The segment also includes a plurality of first interlocking portions, such as hairpin bars, extending from the first end of the arcuate body, and a plurality of second interlocking portions, such as hairpin bars, extending from the second end of the arcuate body. The first and second interlocking portions can be similar or identical. For example, each interlocking portion can comprise a first leg and a second leg partially embedded in the arcuate body and a connecting portion, such as a curved or straight portion, for example, connecting the first leg and the second leg, the connecting portion external to the arcuate body. The segment desirably also includes a flange proximal to each of the first end and the second end of the arcuate body. Each flange can include a first spacing portion that extends radially outward from the outside surface and a second extending portion that extends distally from the main body portion, such as circumferentially or tangentially from a distal end of the first spacing portion. In some embodiments, the segment is precast. In some embodiments, the segment comprises cement or concrete. In some embodiments, the annular structure is a cylindrical structure. In some embodiments, the annular structure is an underground structure. In some embodiments, the annular structure is a manhole.

In a second aspect, a segmented annular structure, such as a cylindrical structure, is disclosed. The segmented annular structure comprises a plurality of segments arranged to form a hollow annular body. The annular body can be substantially cylindrical. Each segment can include an arcuate body extending between a first end and a second end, the body having an inside surface and an outside surface. Each segment includes a plurality of first interlocking portions, such as hairpin bars, extending from the first end of the arcuate body and a plurality of second interlocking portions, such as hairpin bars, extending from the second end of the arcuate body. The first and second interlocking portions can be similar or identical. For example, each interlocking portion can comprise a first leg and a second leg partially embedded in the arcuate body and a connecting portion, such as a curved or straight portion, for example, connecting the first leg and the second leg, the connecting portion external to the arcuate body. Each segment can also include flange proximal to the first end and the second end of the arcuate body Each flange can include a first spacing portion that extends radially outward from the outside surface and a second extending portion that extends distally from the main body portion, such as circumferentially or tangentially from a distal end of the first spacing portion. Joints between adjacent segments of the annular structure include overlapping the first interlocking portion of one of the plurality of segments with the second interlocking portion of another of the plurality of segments. Each joint can also include a field closure casting over the overlap of the first interlocking portion and the second interlocking portion. The field closure casting can comprise cement. The field closure casting can comprise rebar. The rebar can be inserted into the overlap of the first interlocking portion and the second interlocking portion. The field closure can be internal; in other words, made from an interior side of the annular structure. In some embodiments, each joint is transfers moments and shear forces between adjacent segments. In some embodiments, the annular structure is a cylindrical structure. In some embodiments, the annular structure is an underground structure. In some embodiments, the annular structure is a manhole. In some embodiments, each segment is a precast structure. The precast structure can comprise cement.

In a third aspect, a method for forming a joint between adjacent segments in an annular structure is disclosed. The joint is capable of transferring moments and shear forces between adjacent segments. The method includes overlapping interlocking portions, such as hair pin bars, extending from a free ends of a first segment with interlocking portions, such as hair pin bars, extending from a second segment. For example, each interlocking portion can comprise a first leg and a second leg partially embedded in the arcuate body and a connecting portion, such as a curved or straight portion, for example, connecting the first leg and the second leg, the connecting portion portion external to the arcuate body. The method also includes casting a field closure over the overlapping interlocking portions. In some embodiments, the method includes inserting a support member into the overlap between the interlocking portions. In some embodiments, the support member comprises rebar. In some embodiments, the field closure comprises cement or concrete. In some embodiments, the field closure comprises casting the field closure from an interior side of the annular structure. In some embodiments, the method further includes positioning a first segment relative to a second segment to form a section of the annular structure.

BRIEF DESCRIPTION OF THE DRAWINGS

The features and advantages of the present disclosure will become more fully apparent from the following description and appended claims, taken in conjunction with the accompanying drawings. These drawings depict only several embodiments in accordance with the disclosure and are not to be considered limiting of its scope. In the drawings, similar reference numbers or symbols typically identify similar components, unless context dictates otherwise. The drawings may not be to scale.

DETAILED DESCRIPTION

Figure 1:
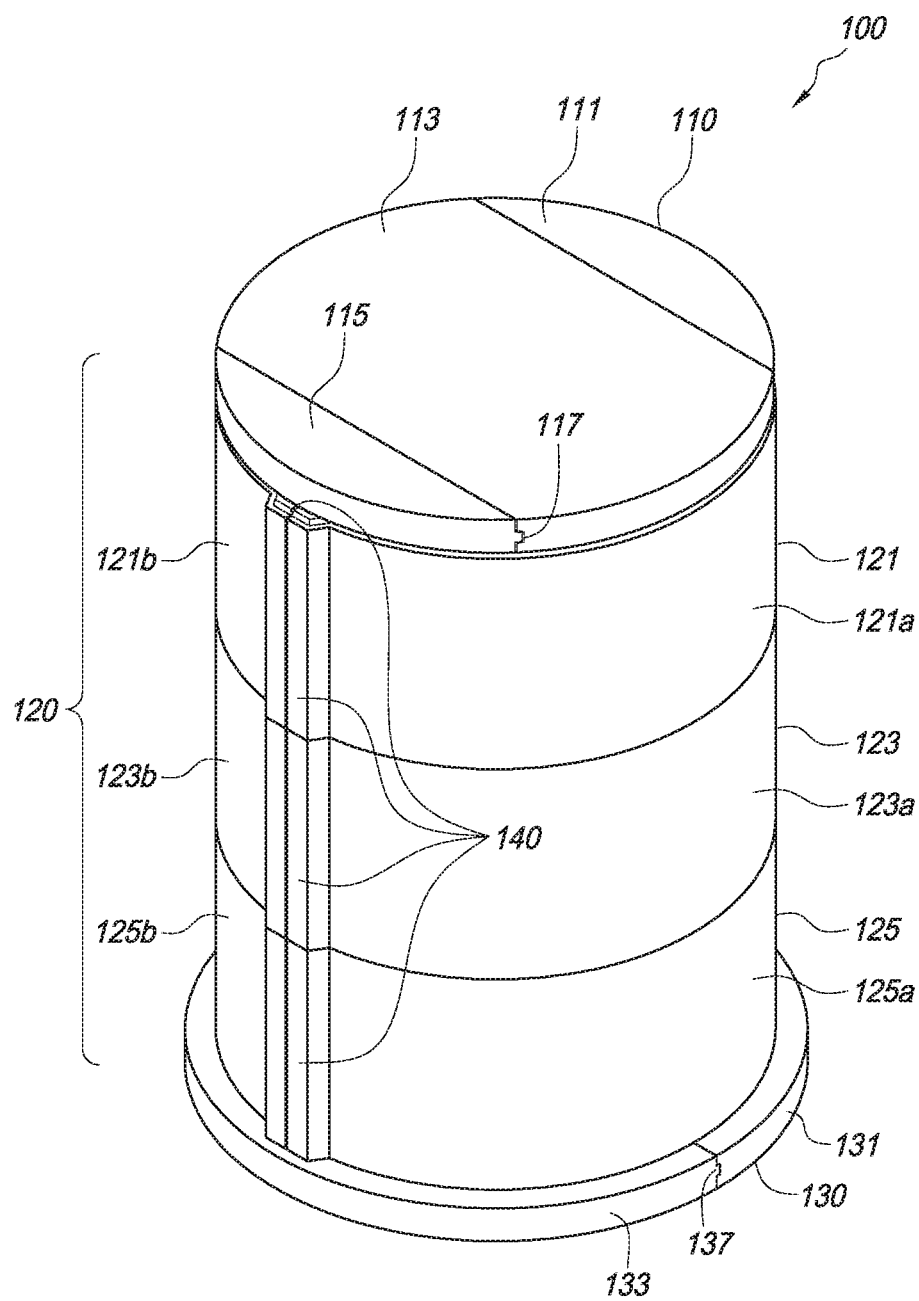
FIG. 1 is a perspective view of an embodiment of an assembled annular structure that includes a base, three segmented sections, and a cover.

This disclosure describes annular structures made from one or more segments, as well as joints between the one or more segments that are capable of transferring linear forces (e.g., shear forces) and moments between the segments and around the structures. The term "annular structure" is to be construed broadly and includes, for example, cylindrical structures, round structures, and structures having curved portions. An annular structure can be a cast structure, such as, a structure cast from cement, concrete, or other materials. Annular structures can be used in a variety of in-ground (e.g., buried) or above-ground applications. As one non-limiting example, an annular structure can be a manhole.

The size of an annular structure can vary as desired depending on the application. For example, an annular structure can have an interior diameter of one foot or less ranging up to hundreds of feet or more. Annular structures with interior diameters larger than 12 feet, however, can often be difficult and expensive to transport. Thus, large annular structures are generally either cast in place (e.g., at the installation site) or assembled from one or more precast segments, which are cast offsite, transported to the installation site, and assembled to form the annular structure. In many situations, casting an annular structure in place can be undesirable, requiring, for example, extended periods of shoring around the installation site, dewatering, traffic control, and/or street or site closure. Use of precast segments can reduce or eliminate the disadvantages associated with cast-in-place annular structures, but can also introduces structural weaknesses into the annular structure as the joints between the segments create weaknesses in the structures. As will be described below, the precast annular structures described herein include joints which mitigate or eliminate these weaknesses.

Buried annular structures typically experience radial or axial forces imposed by the earth backfill surrounding the structure. Generally, forces exerted by the earth backfill do not impose a moment or shear force within the structure. However, live loads (for example, due to heavy passing trucks, etc.) can impose non-radial forces in the form of a uniform pressure on one side of the structure which creates a resulting uniform pressure on the opposite side of the structure caused by the earth backfill's resistive passive pressure. These uniform, non-radial live loads introduce both moments and shears into the buried annular structure. The magnitude of these forces can vary, for example, from 80 pounds per square foot (for an H-10 truck, for example) to as much as 2000 to 5000 pounds per square foot (for heavy mining haul trucks, railroads, or heavy aircraft). Above-ground (i.e., non-buried) structures can also be exposed to moments and shear forces due to seismic activity, wind, or other conditions.

The annular structures described herein can be constructed or assembled from one or more segments, and the joints between the one or more segments can be configured to transfer moments and shear forces continuously around the structures. Thus, in some embodiments, the annular structures described herein can provide the advantages associated with precast segments, such as increased portability and decreased installation time, while also providing the structural advantages typically associated with single-piece annular structures, such as the ability to transfer moments and shear forces continuously around the structures.

In the following detailed description, reference is made to the accompanying drawings. In the drawings, similar symbols typically identify similar components, unless context dictates otherwise. Thus, in some embodiments, part numbers can be used for similar components in multiple figures, or part numbers can vary from figure to figure. The illustrative embodiments described herein are not meant to be limiting. Other embodiments can be utilized, and other changes can be made, without departing from the spirit or scope of the subject matter presented. It will be readily understood that the aspects of the present disclosure and illustrated in the figures, can be arranged, substituted, combined, and designed in a wide variety of different configurations by a person of ordinary skill in the art, all of which are made part of this disclosure.

Reference in the specification to "one embodiment," "an embodiment," or "in some embodiments" means that a particular feature, structure, or characteristic described in connection with the embodiment is included in at least one embodiment of the invention. Moreover, the appearance of these or similar phrases throughout the specification does not necessarily all refer to the same embodiment, nor are separate or alternative embodiments necessarily mutually exclusive. Various features are described herein which can be exhibited by some embodiments and not by others. Similarly, various requirements are described which can be requirements for some embodiments but cannot be requirements for other embodiments.

FIG. 1 is a perspective view of an embodiment of an assembled annular structure 100. In the illustrated embodiment, the annular structure 100 includes a cover 110, a body 120, and a base 130. The body 120 comprises three stacked, segmented sections 121, 123, 125. However, greater or fewer numbers of sections can be stacked to form the annular structure 100 in other embodiments. For example, annular structure 100 can include one, two, three four, five, six, seven, eight, nine, ten, or more sections. As used herein, a "section" refers to an annular (e.g., circular or cylindrical) portion of the annular structure and that may formed as a single piece or from a plurality of segments. In some embodiments, the height of the annular structure 100 can be varied according to the number of sections used. For example, a taller annular structure 100 can include more sections than a shorter annular structure 100, although this need not always be the case.

Figure 6:
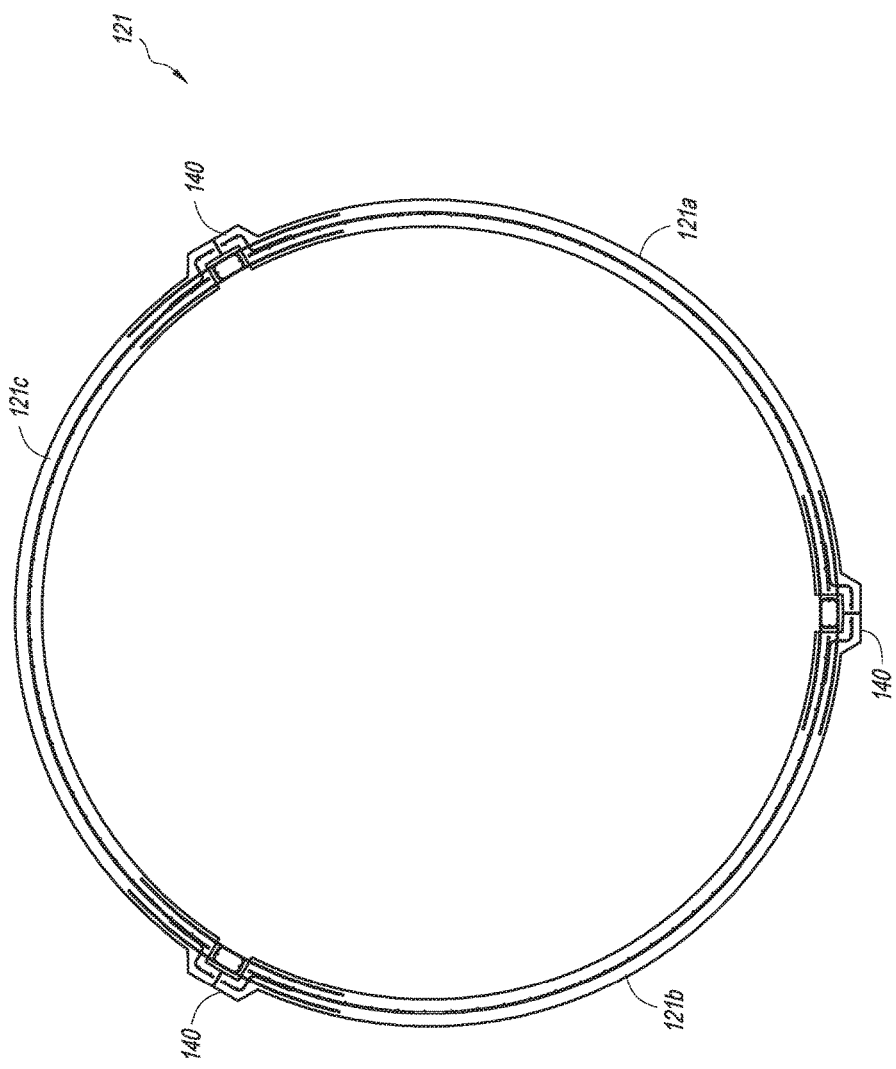
FIG. 6 is a plan view of an embodiment of a section of an annular structure formed from three segments.
Figure 7:
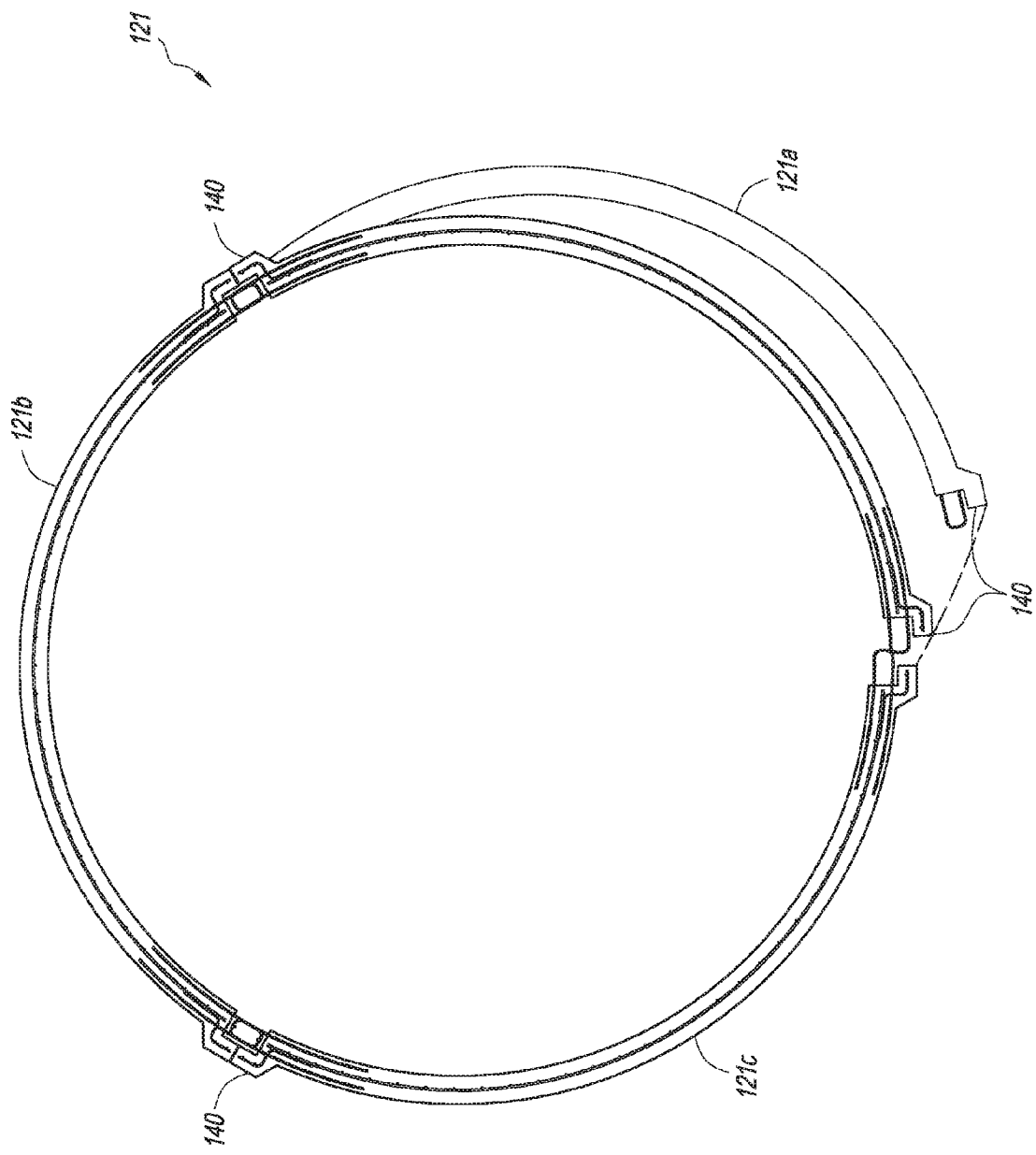
FIG. 7 is a plan view of the section of the annular structure of FIG. 6, which illustrates how the final segment can be rotated into place.

In the illustrated embodiment, each section comprises two segments. As used herein, a "segment" refers to an in individual piece that forms part of a section. A plurality of segments can form a section. For example, the section 121 comprises a first segment 121*a* and a second segment 121*b*, the section 123 comprises a first segment 123*a* and a second segment 123*b*, and the section 125 comprises a first segment 125*a* and a second segment 125*b*. In some embodiments, each section can comprise more than two segments, for example, three, four, five or more segments. In some embodiments, larger diameter sections may include more segments. Each segment can be configured for easy transport, for example, having a width of less than twelve feet. An example of a section comprising three segments is shown in FIGS. 6 and 7. In each section, the segments are attached to each other at a joint 140. As will be described in greater detail below, the joint 140 is configured to transfer both moments and shear forces across the joint.

The body 120 of the annular structure 100 can comprise a hollow cylindrical (or other annular) shape with a substantially circular cross-section. Thus, each of the segments (for example, segment 121*a*, 121*b*, 123*a*, etc.) comprises an arcuate body, that, when joined with the other segments in a section (for example, section 121, 123, etc.) forms the cylindrical body 120. As noted previously, the height of the annular structure 100 can be adjusted by adding or removing sections. For example, a taller annular structure can comprise greater than three sections and a smaller annular structure can comprise fewer than three sections, in some embodiments.

In the illustrated embodiment, the body 120 is capped on one or both of the top and bottom ends by the cover 110 and the base 130; although, either one or both of the cover 110 or the base 130 can be omitted in some embodiments. That is, in some embodiments, the top and/or bottom of the body 120 can remain open. In the illustrated embodiment, the cover 110 comprises a substantially circular shape made up of three pieces 111, 113, 115. The diameter of the cover 110 can be substantially the same as the diameter of the body 120. Each piece 111, 113, 115 is joined to its adjacent pieces at a joint 117. Each piece 111, 113, 115 can include a complimentary structure that mates with a corresponding structure on the adjacent piece. For example, the pieces 113, 115 include features to form a tongue-in-groove joint 117. In some embodiments, the cover 110 can comprise a single piece, or greater or fewer numbers of pieces than shown in the illustrated embodiment. In the illustrated embodiment, the base 130 comprises two pieces 131, 133. The base 130 can comprise a substantially circular shape. The diameter of the base 130 can be larger than the diameter of the body 120. In some embodiments, the diameter of the base 130 is approximately the same as the diameter of the body 120. In the illustrated embodiment, the pieces 131, 133 are joined at a joint 137, which can be similarly formed to as the joint 117, described above.

In some embodiments, the segments (e.g., 121*a*, 121*b*, 123*a*, 123*b*, etc.) of the annular structure 100 can be precast. That is, the components of the annular structure 100 can be precast at a manufacturing location, transported to a final destination, and then assembled to form the annular structure 100. In some embodiments, the precast segments are made from concrete, cement, or other materials. The precast segments can be reinforced, for example, by including rebar (or other strengthening inserts, frames, or structures) structures embedded in the material from which the segments are cast. In some embodiments, strengthen structures may be attached to the exterior surfaces of the segments.

As noted above, it can be desirable that the annular structure 100 is configured to transfer moments and shear forces across the joints 140 between segments.

Figure 2:
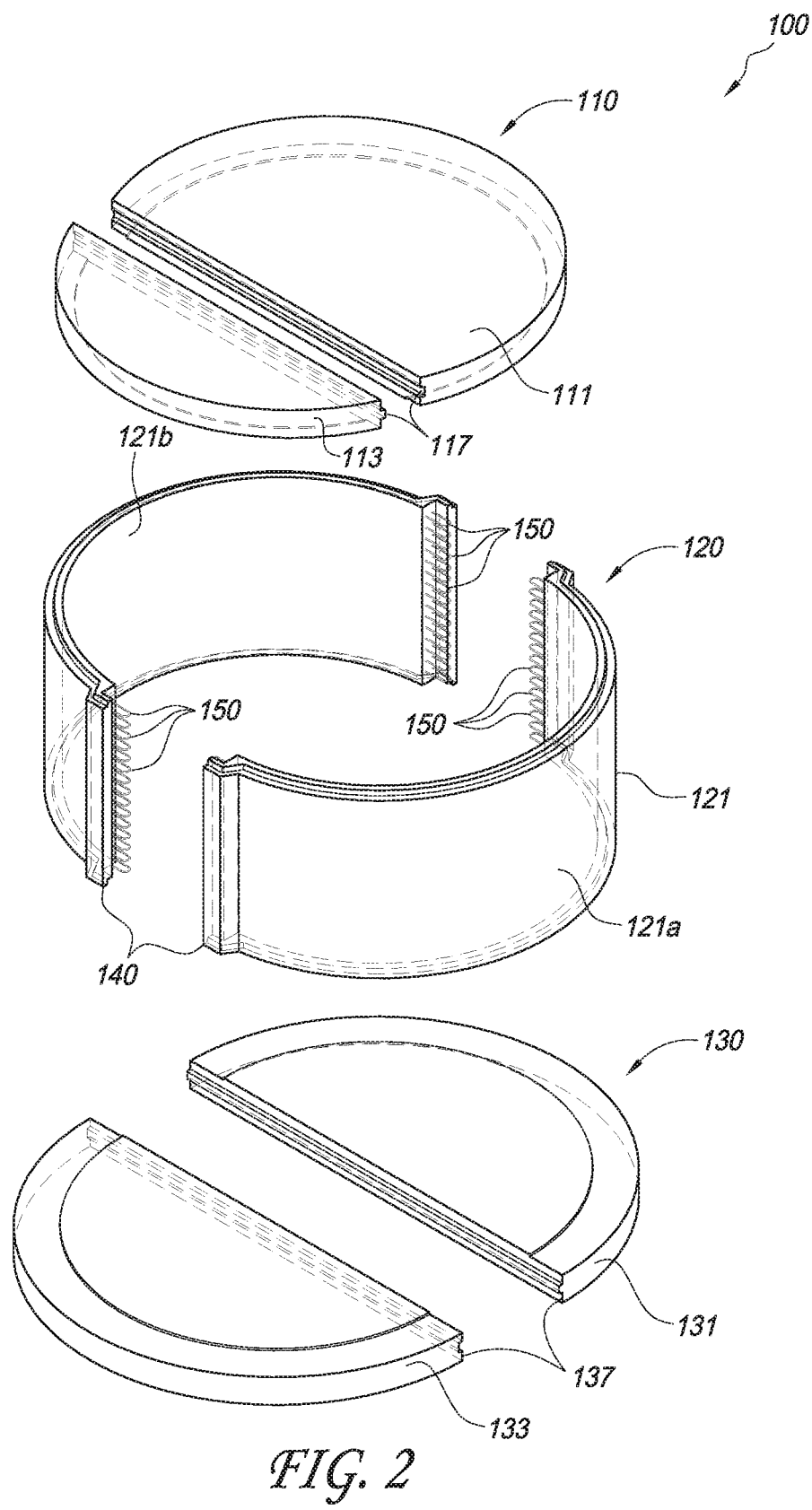
FIG. 2 is an exploded perspective view of an embodiment of an annular structure including a base, a single segmented section, and a cover.

FIG. 2 is an exploded perspective view of an embodiment of an annular structure 100 including a cover 110, a body 120, and a base 130. In the embodiment of FIG. 2, the body 120 of the annular structure 100 comprises only a single section 121, which includes two segments 121*a*, 121*b*. The cover 110 of the embodiment of the annular structure 100 of FIG. 2 comprises two pieces 111, 113. In other respects, the annular structure 100 shown in FIG. 2 can be substantially similar to the annular structure 100 shown in FIG. 1 and described above. In the exploded view of FIG. 2, the joint 140 is illustrated in greater detail. Each of the free ends of the segments 121*a*, 121*b* includes a plurality of interlocking portions 150 extending therefrom. The interlocking portions 150 can be formed as, for example, hairpin bars. The interlocking portions 150 can be formed as overlapping portions. That is, when assembled, the interlocking portions 150 of the segment 121*a* can overlap and intermesh (with or without contacting) the interlocking portions 150 of the segment 121*b*. Stated another way, in some embodiments, each of the interlocking portions 150 of the segment 121*a* is positioned at a different vertical height than each of the interlocking portions 150, such that when assembled, the interlocking portions 150 overlap each other. The interlocking portions 150 can be formed from rebar. The interlocking portions 150 are described in greater detail below.

Figure 3A:
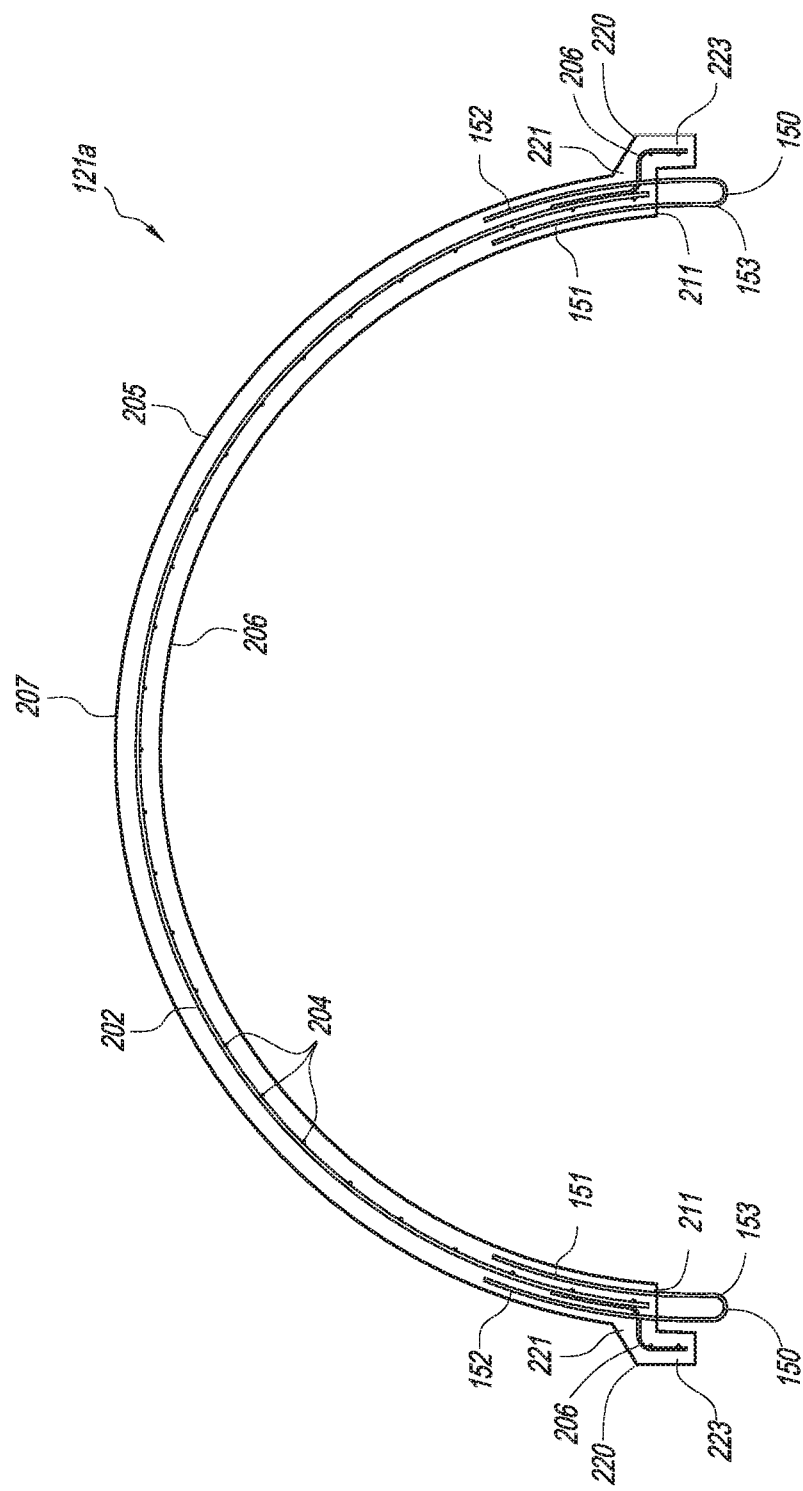
FIG. 3A is a plan view of an embodiment of a segment of an annular structure.

FIG. 3A is a plan view of one embodiment of a half segment 121*a* of an annular structure 100. The half segment 121*a* can be configured to be joined to a second half segment to form a section of the annular structure 100. The segment 121*a* illustrated in FIG. 3A and described in detail below can be representative of any of the segments of the body 120 of the annular structures 100 described throughout this application. The segment 121*a* comprises an arcuate body 205. The arcuate body 205 includes an inner surface 206 and an outer surface 207. The inner surface 206 can have a first radius. The outer surface 207 can have a second radius, the second radius being larger than the first radius. The first radius can be the radius of the inside of the annular structure 100 when assembled and the second radium can be the radius of the outside of the annular structure 100 when assembled. In some embodiments, the first radius of the inner surface 206 is 2 feet, 4 feet, 6 feet, 8 feet, 10 feet, 12 feet, 14 feet, 16 feet, 18 feet, 20 feet, 22 feet, 24 feet, 26 feet, 28 feet, 30 feet, 32 feet or larger; at least 2 feet, at least 4 feet, at least 6 feet, at least 8 feet, at least 10 feet, at least 12 feet, at least 14 feet, at least 16 feet, at least 18 feet, at least 20 feet, at least 22 feet, at least 24 feet, at least 26 feet, at least 28 feet, at least 30 feet, or at least 32 feet; less than 2 feet, less than 4 feet, less than 6 feet, less than 8 feet, less than 10 feet, less than 12 feet, less than 14 feet, less than 16 feet, less than 18 feet, less than 20 feet, less than 22 feet, less than 24 feet, less than 26 feet, less than 28 feet, less than 30 feet, or less than 32 feet or larger, or any value or range of values between the listed values. The second radius of the outer surface 207 can be larger than the first radius by 2 inches, 4 inches, 6 inches, 8 inches, 10 inches, 12 inches, 14 inches, 16 inches, 18 inches, 20 inches, 22 inches, 24 inches or more; at least 2 inches, at least 4 inches, at least 6 inches, at least 8 inches, at least 10 inches, at least 12 inches, at least 14 inches, at least 16 inches, at least 18 inches, at least 20 inches, at least 22 inches, or at least 24 inches; less than 2 inches, less than 4 inches, less than 6 inches, less than 8 inches, less than 10 inches, less than 12 inches, less than 14 inches, less than 16 inches, less than 18 inches, less than 20 inches, less than 22 inches, or less than 24 inches; or any value or range of values between the listed values, for example. The inner surface 206 can be substantially parallel to the outer surface 207. The arcuate body 205 extends between two free ends 211. The free ends 211 can be substantially planar surfaces extending between the inner surface 206 and the outer surface 207. In some embodiments, the free ends 211 can have a non-planar profile.

In the illustrated embodiment, support members 202, 204 are embedded in the arcuate body 205. In some embodiments, the support members 202, 204 comprise rebar embedded in the arcuate body 205. In the illustrated embodiment, support members 202 are embedded in the arcuate body 205 every 6 inches along the height of the arcuate body 205. The support members 202 are embedded between the inner surface 205 and the outer surface 207 and are curved to follow the shape of the arcuate body. The support members 202 can be parallel to the top and or bottom surfaces 208, 209 of the arcuate body shown in FIG. 3B. The support members 202 can be embedded every 2 inches, 4 inches, 6 inches, 8 inches, 10 inches, 12 inches, 14 inches, 16 inches, 18 inches, 20 inches, 22 inches, 24 inches or more, for example. In some embodiments, the support members 202 can be omitted. In the illustrated embodiment, support members 204 are embedded in the arcuate body 205 every 12 inches along the length of the arcuate body 205. The support members 204 are embedded between the inner surface 205 and the outer surface 207. The support members 204 can be parallel to the free ends 211 of the arcuate body 205. The support members 204 can be embedded every 2 inches, 4 inches, 6 inches, 8 inches, 10 inches, 12 inches, 14 inches, 16 inches, 18 inches, 20 inches, 22 inches, 24 inches or more, for example. In some embodiments, the support members 204 can be omitted. In some embodiments, support members 204 a perpendicular to support members 202.

In the illustrated embodiment, flanges 220 extend from the outer surface 207 of the arcuate body 205 proximal to the free ends 211. In the illustrated embodiment, the flanges 220 include a first spacing portion 221 that extends generally radially outward from the outer surface 207 proximal to the free ends 211. The flanges 220 also include a second extending portion 223 that extends distally from the arcuate body 205, such as circumferentially or tangentially from the end of the first portion spacing 221.

In the illustrated embodiment, the arcuate body 205 and the flanges 220 are integrally formed. The arcuate body 205 and the flanges 220 can be formed (e.g., cast) from concrete, cement, or other materials. In some embodiments, the arcuate body 205 and the flanges 220 are cast at the same time. The material can be reinforced throughout with support members (such as support members 202, 204). As shown in the illustrated embodiment, the arcuate body 205 is reinforced with both tangentially support members 202 and longitudinally extending support members 204. A support member 206 also reinforces the flanges 220 and can extend from the arcuate body 205 into the flanges 220.

Figure 3B:
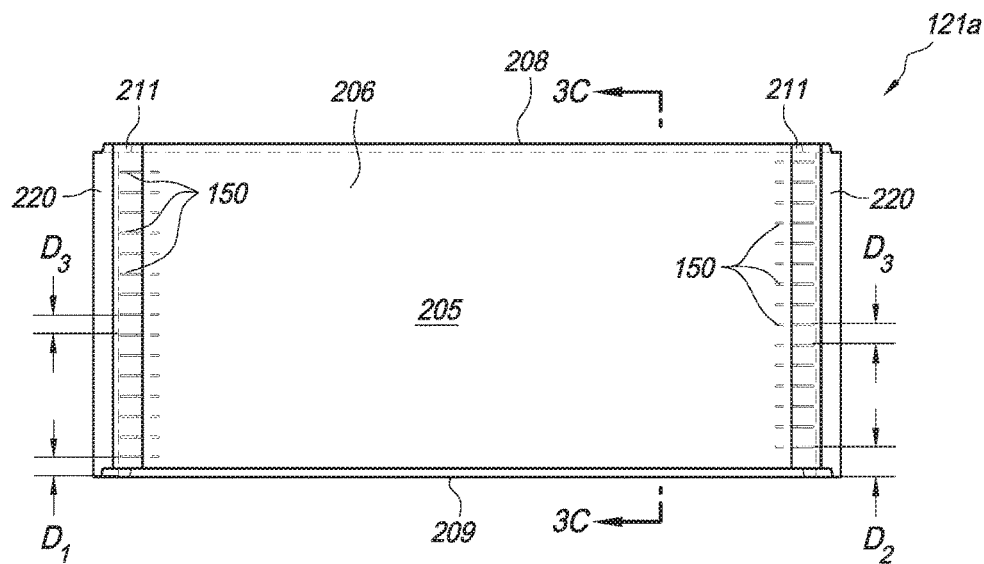
FIG. 3B is an interior side view of the segment of FIG. 3A.

The interlocking portions 150 extend tangentially outward from the free ends 211. As shown in the side view of FIG. 3B, in the illustrated embodiment, the interlocking portions 150 comprise hairpin bars that extend outwardly from the free ends 211 approximately every six inches along the height of the segment 121a, although other spacings of smaller or greater distances are possible. For example, the interlocking portions can be spaced every 2 inches, 4 inches, 6 inches, 8 inches, 10 inches, 12 inches, 14 inches, 16 inches, 18 inches, for example. Further, as shown in FIG. 3B, the interlocking portions 150 extending from one free end 211 are offset from the interlocking portions 150 extending from the other free end 211. That is, the interlocking portion 150 on one free end are positioned at different vertical heights than the interlocking portions 150 on the other free end 211. This can allow the interlocking portions 150 to overlap with or intermesh with (with or without contacting) the interlocking portions of another section to form a joint 140 as described herein. Accordingly, the interlocking portions 150 can be considered overlapping portions. For example, on the free end 211 illustrated on the left side of FIG. 3B, the first interlocking portion 150 is spaced a distance $D_1$ from the bottom edge 209 and subsequent interlocking portions 150 are spaced each spaced a distance $D_3$ up the free end 211. On the free end 211 on the right side of FIG. 3B, the first interlocking portions 150 is spaced a distance $D_2$ inches above the bottom edge 209 and subsequent interlocking portions 150 are each spaced a distance $D_3$ up the free end 211. The distance $D_1$ can be different from the distance $D_2$ such that the interlocking portions 150 on one free end 211 are offset or staggered relative to the interlocking portions 150 on the other free end 211. The spacing between interlocking portions ($D_3$) can be the same on each free end 211.

For example, the distance $D_1$ can be 3.5 inches, the distance $D_2$ can be 6.5 inches, and the distance $D_3$ can be 6 inches. Thus, in this example, the interlocking portions 150 on the left free end 211 are offset from the interlocking portions 150 on the right free end 211 by approximately 3 inches. As will be described below, when two segments 121a are joined together, the interlocking segments 150 of one segment overlap with the interlocking segments 150 of the other segment. In this example, there would be a three-inch spacing between interlocking portions 150 from each segment 121a. These dimensions are provided by way of example, and other spacings and dimensions are possible. The interlocking portions 150 can be considered overlapping portions because the interlocking portions 150 overlap with the interlocking portions 150 of an adjacent segment 121a when installed.

Returning to the illustrated embodiment of FIG. 3A, the interlocking portions 150 are each formed as a hairpin bar includes first and second legs 151, 152 that are connected by a connecting potion 153. In some embodiments, the connecting portion 153 can be curved or straight. In some embodiments, the legs 151, 152 extend into the arcuate body 205. The legs 151, 152 can be slightly curved so as to follow the curvature of the arcuate body 205. In some embodiments, the distance between the legs 151, 152 is substantially constant. In some embodiments, the interlocking portion 150 can be a substantially U-shaped hairpin bar, although, as noted above, the free ends of the U can follow the curve of the arcuate body 205. In some embodiments, the interlocking portions 150 each lie substantially in a plane that is parallel to a plane containing the top edge 208 or the bottom edge 209 of the arcuate body 205. Or, stated another way, in some embodiments, the interlocking portions 150 each lie substantially in a plane that is normal to the longitudinal axis of the segment 121a, body 120, or annular structure 100.

Figure 3C:
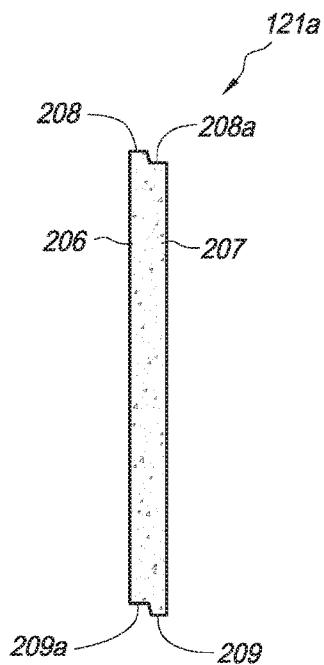
FIG. 3C is a cross-sectional view of the segment of FIG. 3B.

A cross-sectional view of the segment 121a is shown in FIG. 3C. As shown, the upper edge 208 can contain a lip 208a and the lower edge 209 can contain a lip 209a. The lips 208a, 209a can facilitate stacking of the sections 121. Accordingly, the lip 209a can have a complimentary shape to the lip 208a. The profile of the upper edge 208, lip 208a, lower edge 209, and lip 209a can be varied in a wide variety of ways, all of which are within the scope of this disclosure.

Figure 4:
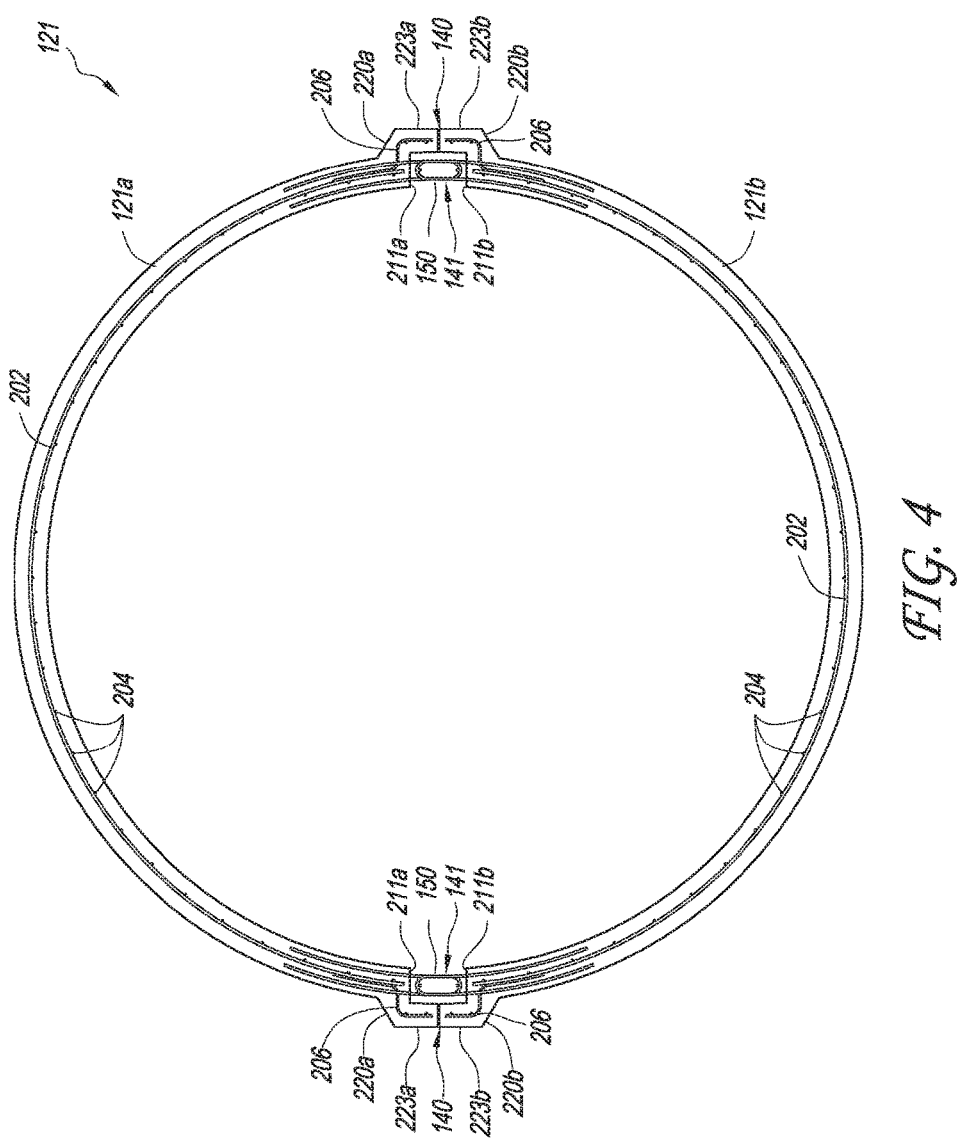
FIG. 4 is a plan view of an embodiment of a section of an annular structure formed from two segments, such as the half segment of FIGS. 3A-3C.

FIG. 4 shows a plan view of one embodiment of a section 121 of an annular structure 100 formed from two segments 121a, 121b. As shown in FIG. 4, in the assembled state, two segments 121a, 121b are brought together to form the section 121. The segment 121a is positioned such that the second portions 223a of the flanges 220a are brought into contact with the second portions 223b of the flanges 220b of the segment 121b. In this position, the interlocking portions 150 extending from the segments 121a, 121b overlap in a void 141 created between the free ends 211a, 211b and the flanges 220a, 220b of the segments 121a, 121b.

Figure 5:
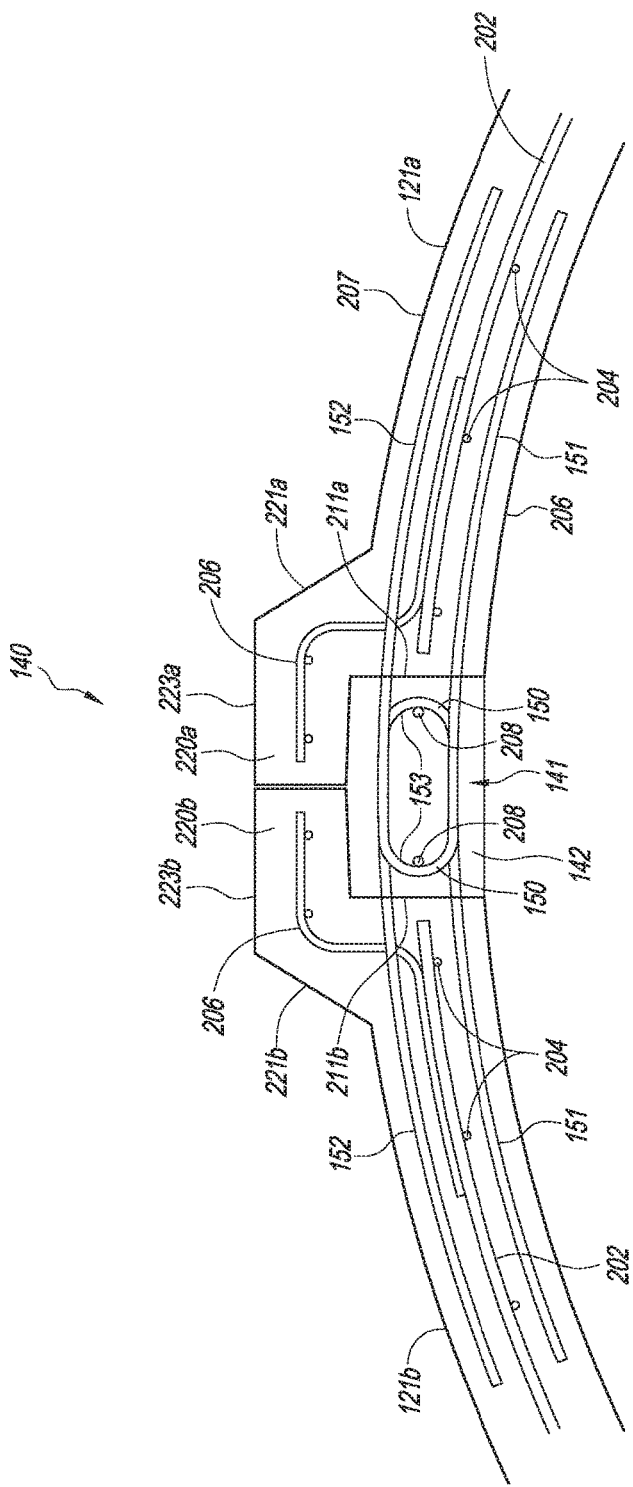
FIG. 5 is a detailed plan view of an embodiment a joint between the two segments of FIG. 4.

FIG. 5 shows a detailed view of one of the joints 140 between segments 121a, 121b of FIG. 4. The joint 140 is formed by overlapping the interlocking portions 150 in the void 141 formed between the free ends 211a, 211b, and the flanges 220a, 220b. As noted above, the interlocking portions 150 of the free end 211a of the segment 121a can be offset from the interlocking portions 150 of the free end 211b of the segment 121b. Thus, when viewed from above as in FIG. 5, the interlocking portions 150 of the segments 121a, 121b overlap and can be considered overlapping portions. The joint 140 can also include support members 208 positioned inside or outside of the connecting portions 153 of the interlocking portions 150. In some embodiments, the support members 208 comprise rebar. In some embodiments, the support members 208 can be attached (e.g., tied, welded, etc.) to the interlocking portions 150.

The joint 140 also includes an interior field closure casting 142 in the void 141. The interior field closure casting 142 can be formed when the annular structure 100 is assembled by filling the void 141 with concrete. Importantly, because the flanges 220a, 220b shield the void 141 from the excavation, long term shoring is not necessary, and the interior filed closure casting 142 can be made from the interior of the annular structure 100. The assembled joint 140, as shown in FIG. 5, is capable of transferring moments and shear forces across adjacent segments of the annular structure 100.

FIG. 6 shows a plan view of one embodiment of a section 121 of an annular structure 100 formed from three segments 121a, 121b, 121c. A joint 140 is formed between each of the segments 121a, 121b, 121c as described above. The joint 140 is configured to transfer moments and forces across the joint 140 between the segments 121a, 121b, 121c. FIG. 7 is a plan view of the section 121 of the annular structure 100 shown in FIG. 6, which illustrates how the final segment 121a can be rotated into place. The annular structure 100 and segments 121a, 121b, 121c shown in FIGS. 6 and 7 can be substantially similar to the annular structures and segments discussed above. However, this embodiment includes three segments for each section instead of two. Similarly, the number of segments can be varied to include even greater numbers of segments, such as, four, five, or more segments. Increasing the number of segments in a section can allow construction of annular structures with increasingly larger internal radii, while still allowing for individual segment sizes that are easily transportable. The joints 140 between segments 121a, 121b, 121c can be formed as described above in reference to FIG. 5. In some embodiments, the section 121 can comprise other numbers of segments, for example, two, three, four, five, six, seven, eight, nine, ten, or more segments.

The foregoing description details certain embodiments of the systems, devices, and methods disclosed herein. It will be appreciated, however, that no matter how detailed the foregoing appears in text, the systems, devices, and methods can be practiced in many ways. As is also stated above, it should be noted that the use of particular terminology when describing certain features or aspects of the invention should not be taken to imply that the terminology is being re-defined herein to be restricted to including any specific characteristics of the features or aspects of the technology with which that terminology is associated.

It will be appreciated by those skilled in the art that various modifications and changes can be made without departing from the scope of the described technology. Such modifications and changes are intended to fall within the scope of the embodiments. It will also be appreciated by those of skill in the art that parts included in one embodiment are interchangeable with other embodiments; one or more parts from a depicted embodiment can be included with other depicted embodiments in any combination. For example, any of the various components described herein and/or depicted in the Figures can be combined, interchanged or excluded from other embodiments.

With respect to the use of substantially any plural and/or singular terms herein, those having skill in the art can translate from the plural to the singular and/or from the singular to the plural as is appropriate to the context and/or application. The various singular/plural permutations can be expressly set forth herein for sake of clarity.

It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims can contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

All references cited herein are incorporated herein by reference in their entirety. To the extent publications and patents or patent applications incorporated by reference contradict the disclosure contained in the specification, the specification is intended to supersede and/or take precedence over any such contradictory material.

The term "comprising" as used herein is synonymous with "including," "containing," or "characterized by," and is inclusive or open-ended and does not exclude additional, unrecited elements or method steps.

Reference in the specification to "one embodiment," "an embodiment," or "in some embodiments" means that a particular feature, structure, or characteristic described in connection with the embodiment is included in at least one embodiment described in the disclosure. Moreover, the appearance of these or similar phrases throughout the specification does not necessarily refer to the same embodiment, nor are separate or alternative embodiments necessarily mutually exclusive. Various features are described herein which can be exhibited by some embodiments and not by others. Similarly, various requirements are described which can be requirements for some embodiments but are not requirements for other embodiments.

The above description discloses several methods and materials of the present invention. This invention is susceptible to modifications in the methods and materials, as well as alterations in the fabrication methods and equipment. Such modifications will become apparent to those skilled in the art from a consideration of this disclosure or practice of the invention disclosed herein. Consequently, it is not intended that this invention be limited to the specific embodiments disclosed herein, but that it cover all modifications and alternatives coming within the true scope and spirit of the invention as embodied in the attached claims. Applicant reserves the right to submit claims directed to combinations and sub-combinations of the disclosed inventions that are believed to be novel and non-obvious. Inventions embodied in other combinations and sub-combinations of features, functions, elements and/or properties can be claimed through amendment of those claims or presentation of new claims in the present application or in a related application. Such amended or new claims, whether they are directed to the same invention or a different invention and whether they are different, broader, narrower or equal in scope to the original claims, are to be considered within the subject matter of the inventions described herein.

What is claimed is:

1. A segment for an annular structure, comprising:
   an arcuate body extending between a first end and a second end, the arcuate body having an inside surface and an outside surface;
   a first plurality of interlocking portions extending from the first end of the arcuate body and a second plurality of interlocking portions extending from the second end of the arcuate body, and
   a flange proximal to each of the first end and the second end of the arcuate body, each flange including a first spacing portion that extends radially outward from the outside surface and a second extending portion that extends distally from a distal end of the first spacing portion away from the arcuate body.

2. The segment of claim 1, wherein each interlocking portion comprises a first leg and a second leg each partially embedded in the arcuate body and a connecting portion connecting the first leg and the second leg, the connecting portion external to the arcuate body.

3. The segment of claim 1, wherein each interlocking portion comprises a hairpin bar.

4. The segment of claim 1, wherein the segment is a precast structure.

5. The segment of claim 4, wherein the precast structure comprises concrete or cement.

6. The segment of claim 1, wherein the first plurality of interlocking portions is offset from the second plurality of interlocking portions.

7. A segmented annular structure comprising:
   a plurality of segments arranged to form a hollow annular body, each segment comprising
      an arcuate body extending between a first end and a second end, the body having an inside surface and an outside surface;
      a first plurality of interlocking portions extending from the first end of the arcuate body and a second plurality of interlocking portions extending from the second end of the arcuate body; and
      a flange proximal to each of the first end and the second end of the arcuate body, each flange including a first spacing portion that extends radially outward from the outside surface and a second extending portion that extends distally from a distal end of the first spacing portion away from the arcuate body; and
   wherein joints between adjacent segments of the plurality of segments comprise an overlap of a first plurality of interlocking portions of one of the plurality of segments with a second plurality of interlocking portions of another of the plurality of segments.

8. The segmented annular structure of claim 7, wherein the joints further comprise a field closure casting over the overlap of the first plurality of interlocking portions and the second plurality of interlocking portions.

9. The segmented annular structure of claim 8, wherein the field closure casting comprises concrete or cement.

10. The segmented annular structure of claim 7, wherein the interlocking portion of the first plurality of interlocking portions and the second plurality of interlocking portions comprises a first leg and a second leg each partially embedded in the arcuate body and a connecting portion connecting the first leg and the second leg, the connecting portion external to the arcuate body.

11. The segmented annular structure of claim 7, wherein the segmented annular structure is a precast structure.

12. The segmented annular structure of claim 7, wherein the segmented annular structure is a manhole.

13. The segmented annular structure of claim 7, wherein each segment comprises a precast structure.

14. The segmented annular structure of claim 7, wherein the joints are configured to transfer moments and shear forces between adjacent segments.

15. A method for forming a joint between adjacent segments in an annular structure such that the joint transfers moments and shear forces between adjacent segments, the method comprising:
  overlapping interlocking portions extending from a free ends of a first segment with interlocking portions extending from a second segment; and
  casting a field closure over the overlapping interlocking portions;
  wherein each segment of the adjacent segments in the annular structure comprises:
    an arcuate body extending between a first end and a second end, the arcuate body having an inside surface and an outside surface;
    a first plurality of interlocking portions extending from the first end of the arcuate body and a second plurality of interlocking portions extending from the second end of the arcuate body, and
    a flange proximal to each of the first end and the second end of the arcuate body, each flange including a first spacing portion that extends radially outward from the outside surface and a second extending portion that extends distally from a distal end of the first spacing portion away from the arcuate body.

16. The method of claim 15, further comprising:
  inserting a support member into the overlap between the interlocking portions.

17. The method of claim 16, wherein the support member comprises rebar.

18. The method of claim 16, wherein the field closure comprises cement or concrete.

19. The method of claim 16, wherein casting the field closure comprises casting the field closure from an interior side of the annular structure.

20. The method of claim 16, further comprising positioning a first segment relative to a second segment to form a section of the annular structure.

* * * * *